United States Patent Office 3,419,521
Patented Dec. 31, 1968

3,419,521
PROCESS FOR VULCANIZING RUBBERS IN PRESENCE OF THIOPHOSPHORYL DISULFIDES
Gerald Scott and Derek Williams, Manchester, England, assignors to Imperial Chemical Industries Limited, London, England, a corporation of Great Britain
No Drawing. Continuation of application Ser. No. 406,907, Oct. 27, 1964. This application Sept. 15, 1967, Ser. No. 668,258
Claims priority, application Great Britain, Feb. 23, 1960, 6,314/60
13 Claims. (Cl. 260—41.5)

ABSTRACT OF THE DISCLOSURE

Bis(dialkylthiophosphoryl)disulphides and the corresponding dicycloalkyl, diaryl and diaralkyl compounds are used in conjunction with conventional sulphur-containing accelerators and sulphur for the vulcanisation of natural and sulphur-curable rubbers. An increase in activity of the conventional accelerator is obtained, leading to improved properties of the vulcanisate and shorter times of cure, as well as a reduced tendency to premature vulcanisation.

---

This application is a continuation of application Ser. No. 406,907, now abandoned, which in turn is a continuation-in-part of application Ser. No. 88,626, now abandoned.

This invention relates to an improved process for the vulcanisation of rubber and more particularly to the use of certain bis(thiophosphoryl)disulphides in conjunction with conventional vulcanisation accelerators in the sulphur curing of natural and synthetic rubbers.

It has been found that by the addition of certain bis(thiophosphoryl)disulphides not only is the activity of conventional accelerators increased, thus producing vulcanised rubbers having high physical properties in shorter times, but also the tendency of these accelerators to cause premature vulcanisation or scorching is reduced.

Thus according to our invention there is provided a process for the vulcanisation of natural or synthetic rubbers derived to a major extent from diolefin monomers by heating with sulphur and an accelerator characterised in that as accelerator there is used a mixture of a conventional sulphur-containing rubber vulcanisation accelerator and a bis(thiophosphoryl)disulphide of the formula

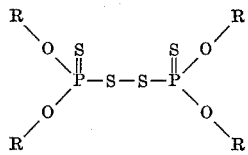

wherein each R is an alkyl, cycloalkyl, aryl or aralkyl group.

As conventional sulphur-containing rubber vulcanisation accelerators which may be used in the process of the invention there may be mentioned tetraalkyl thiuram disulphides such as tetramethylthiuram disulphide, tetraethylthiuram disulphide, tetrabutylthiuram disulphide and bispentamethylenethiuram disulphide, tetraalkylthiuram monosulphides such as tetramethylthiuram monosulphide, mercaptobenzthiazole and its metal salts such as zinc mercaptobenzthiazole, mercaptobenthiazyl disulphide, sulphenamides such as cyclohexylbenzthiazyl sulphenamide, tert.-octylbenzthiazyl sulphenamide, tert.-butylbenzthiazyl sulphenamide, N-oxydiethylenebenzthiazyl sulphenamide, diisopropylbenzthiazylsulphenamide, dithiopiperidine, dithiomorpholine, and condensates of sulphenamides such as benzthiazylsulphenamide with aldehydes, and derivatives of dithiocarbamic acid such as zinc diethyldithiocarbamate, zinc pentamethylenedithiocarbamate, and dialkyl(dialkylthiocarbamyl)dithiophosphates obtained by reaction of dialkylthiocarbamyl chlorides and dialkyldithiophosphoric acid, for example diisopropyl(diethylthiocarbamyl)dithiophosphate.

The groups each represented by R in the bis(thiophosphoryl)disulphide may be the same or different and as examples of such groups there may be mentioned methyl, ethyl, n-propyl, isopropyl, n-butyl, isobutyl, sec.-butyl, sec.-octyl, cyclohexyl and phenyl. It is preferred however to use those compounds in which each R represents an alkyl group which contains at least three carbon atoms, and particularly a secondary or tertiary alkyl group, or cycloalkyl group as these compounds have the greatest effect in reducing the tendency of the rubber mix to scorch. These compounds may be prepared for example by interaction of salts of the appropriate dithiophosphates with chlorine, hypochlorous acid or hydrogen peroxide.

The synthetic rubbers which may be vulcanised by the process of our invention are those in which the major part of the components are diolefines, for example polymers of butadiene, isoprene and 2-chlorobutadiene and copolymers of these with minor amounts of acrylonitrile, styrene, methyl methacrylate and other well known polymerisable compounds which may be used in the manufacture of synthetic rubbers.

The vulcanisation of the rubber by heating with sulphur and the accelerator mixtures may be carried out at the temperatures commonly in use and preferably between 120° and 160° C. although higher or lower temperatures may be used if desirable.

The sulphur usage may be that conventionally employed, that is amounts between 0.2 and 3.5% of the weight of the rubber. Owing to their activating effect the addition of bis(thiophosphoryl)disulphides permits a reduction in sulphur usage to below 2% of the weight of rubber without loss of curing speed and affording increased safety from scorch.

If desired the natural or synthetic rubber may also contain known adjuvants for the manufacture of rubber compositions for example, fillers, channel and furnace blacks, antioxidants, antiozonants, other accelerator activators, retarders, waxes, blowing agents and pigments. The bis(thiophosphoryl)disulphides are of particular value when used with high abrasion furnace blacks, which are well known to increase considerably the tendency of the conventional rubber mix to scorch, since the reduction in scorch is most pronounced in these circumstances.

The conventional accelerators and bis(thiophosphoryl)disulphides may be added to the rubber before vulcanisation either separately or in the form of a mixture. The constituents of the mixture together may be used in amount up to 10% of the weight of the rubber and are preferably used in amount between 0.5 and 2%. The proportion of bis(thiophosphoryl)disulphide may be from 15 to 90% of the weight of the mixture and is preferably between 30 and 70%.

As a further feature of our invention we provide new vulcanisable compositions of natural and synthetic rubbers derived to a major extent from diolefin components characterised in that there is contained therein sulphur, a conventional vulcanisation accelerator and a bis(thiophosphoryl)disulphide as hereinbefore defined.

By the use of these bis(thiophosphoryl)disulphides the activity of the conventional accelerator is increased to such an extent that considerable improvements both in rate of cure and physical properties can be obtained. Furthermore, the mixes do not scorch so readily thus permitting longer milling, compounding or other handling times without danger of premature vulcanisation. A further advantage of the use of bis(thiophosphoryl)disulphides is that rubber vulcanisates prepared employing these compounds have enhanced resistance to attack by ozone.

Our invention is illustrated but not limited by the following examples in which all parts are by weight unless otherwise stated.

EXAMPLE 1

The following rubber mixes are prepared by compounding on a mill:

|  | A | B | C |
|---|---|---|---|
| Smoked sheet | 100 | 100 | 100 |
| Stearic acid | 3 | 3 | 3 |
| Zinc oxide | 3.5 | 3.5 | 3.5 |
| High abrasion furnace black | 50 | 50 | 50 |
| Softener | 4 | 4 | 4 |
| Sulphur | 2.5 | 2.5 | 2.5 |
| N-cyclohexyl-benzthiazyl sulphenamide | 0.5 | 0.5 | 0.5 |
| Bis(diisopropylthiophosphoryl)disulphide | 0 | 1 | 0.5 |

Samples of these are cured at 141° C. for different lengths of time and these possess the following properties:

|  | Time (mins.) | A | B | C |
|---|---|---|---|---|
| Tensile Strength (kg./sq.cm.) | 10 | 196 | 282 | 273 |
|  | 20 | 277 | 244 | 274 |
|  | 30 | 277 | 190 | 241 |
| Elongation at Break, percent | 10 | 547 | 540 | 576 |
|  | 20 | 562 | 386 | 468 |
|  | 30 | 487 | 284 | 375 |
| Modulus at 300% Elongation (kg./sq.cm.) | 10 | 90 | 161 | 131 |
|  | 20 | 142 | 209 | 188 |
|  | 30 | 180 | ---- | 214 |
| Mooney Scorch mins. at 120° C. (Min.+10) |  | 24 | 29.75 | 27.5 |

EXAMPLE 2

Rubber mixes D and E similar to mixes A and C respectively in Example 1 are prepared using in place of the N-cyclohexylbenzthiazyl sulphenamide 0.25 part of tetramethyl thiuram disulphide. Samples of these are cured at 141° C. for different lengths of time and these have the following properties:

|  | Time (mins.) | D | E |
|---|---|---|---|
| Tensile Strength (kg./sq.cm.) | 10 | 273 | 267 |
|  | 20 | 240 | 237 |
|  | 30 | 249 | 214 |
| Elongation at Break, percent | 10 | 508 | 472 |
|  | 20 | 450 | 400 |
|  | 30 | 443 | 342 |
| Modulus at 300% Elongation (kg./sq.cm.) | 10 | 169 | 183 |
|  | 20 | 165 | 192 |
|  | 30 | 183 | 210 |
| Mooney Scorch mins. at 120° C. (min.+10) |  | 10.75 | 19.75 |

EXAMPLE 3

Rubber mixes F and G similar to mixes A and B respectively in Example 1 are prepared using in place of the N-cyclohexylbenzthiazyl sulphenamide 0.5 part of tert.-octylbenzthiazyl sulphenamide.

Samples of these are cured at 141° C. for different lengths of time and these have the following properties:

|  | Time | F | G |
|---|---|---|---|
| Tensile Strength (kg./sq.cm.) | 10 | 109 | 212 |
|  | 20 | 251 | 268 |
|  | 30 | 255 | 239 |
| Elongation at Break, percent | 10 | 446 | 555 |
|  | 20 | 565 | 450 |
|  | 30 | 472 | 370 |
| Modulus at 300% Elongation (kg./sq.cm.) | 10 | 65 | 101 |
|  | 20 | 122 | 191 |
|  | 30 | 167 | 217 |
| Mooney Scorch mins. at 120° C. (min.+10) |  | 27.75 | 31.75 |

EXAMPLE 4

The following rubber mixes are prepared by compounding on a rubber mill:

|  | Mix H | Mix I | Mix J | Mix K |
|---|---|---|---|---|
| Butadiene-styrene copolymer | 100 | 100 | 100 | 100 |
| Stearic acid | 1.5 | 1.5 | 1.5 | 1.5 |
| Zinc oxide | 3.5 | 3.5 | 3.5 | 3.5 |
| High abrasion furnace black | 50 | 50 | 50 | 50 |
| Softener | 4 | 4 | 4 | 4 |
| Processing oil | 4 | 4 | 4 | 4 |
| Sulphur | 1.8 | 1.8 | 1.8 | 1.8 |
| N-cyclohexylbenzthiazyl sulphenamide | 1.2 | 1.2 | 1.2 | 1.2 |
| Bis(diisopropylthiophosphoryl)disulphide |  | 1.0 | 0.5 | 0.25 |
| Zinc dinonyldithiocarbamate |  |  | 0.5 | 0.25 |

Samples of these are cured at 153° C. for different lengths of time and these possess the following properties:

|  | Time | H | I | J | K |
|---|---|---|---|---|---|
| Tensile Strength (kg./sq.cm.) | 10 | ---- | 116 | 153 | 150 |
|  | 20 | 194 | 209 | 219 | 201 |
|  | 30 | 215 | 208 | 203 | 210 |
|  | 40 | 204 | 185 | ---- | 204 |
| Elongation at Break (kg./sq.cm.) | 10 | ---- | 567 | 647 | 580 |
|  | 20 | 523 | 409 | 382 | 416 |
|  | 30 | 500 | 386 | 342 | 419 |
|  | 40 | 456 | 345 | ---- | 405 |
| Modulus at 300% Elongation | 10 | ---- | 50 | 56 | 64 |
|  | 20 | 106 | 156 | 179 | 148 |
|  | 30 | 124 | 169 | 193 | 155 |
|  | 40 | 134 | 171 | ---- | 155 |
| Mooney Scorch mins. at 140° C. (min.+10) |  | 22 | 22.5 | 19 | 21 |

EXAMPLE 5

The following rubber mixes are prepared by compounding on a rubber mill:

|  | Mix L | Mix M |
|---|---|---|
| Smoked sheet | 100 | 100 |
| Stearic acid | 3 | 3 |
| Zinc oxide | 3.5 | 3.5 |
| High abrasion furnace black | 50 | 50 |
| Softener | 4 | 4 |
| Sulphur | 2.5 | 2.5 |
| N-tert.-octyldimethylthiocarbamyl sulphenamide | 0.5 | 0.25 |
| bis(diisopropylthiophosphoryl)disulphide |  | 0.25 |

Samples of these are cured at 141° C. for different lengths of time and give the following properties:

|  | Time | L | M |
|---|---|---|---|
| Tensile Strength (kg./sq.cm.) | 10 | 267 | 249 |
|  | 20 | 263 | 260 |
|  | 30 | 252 | 249 |
| Elongation at Break | 10 | 515 | 544 |
|  | 20 | 482 | 501 |
|  | 30 | 472 | 490 |
| Modulus at 300% elongation | 10 | 160 | 130 |
|  | 20 | 175 | 162 |
|  | 30 | 162 | 153 |
| Mooney Scorch mins. at 120° C. (min.+10) |  | 17.25 | 26 |

EXAMPLE 6

The following rubber mixes are prepared by compounding on a rubber mill:

| Natural rubber smoked sheet | 100 |
|---|---|
| Stearic acid | 3 |
| Zinc oxide | 3.5 |
| High abrasion furnace black | 50 |
| Softener | 4 |
| Sulphur | 2.5 |
| Tert.-octylbenzthiazylsulphenamide | 0.5 |
| Bis(thiophosphoryl)disulphide | 0.5 |

Samples of these are cured at 141° for different lengths of time and the properties of the vulcanisates and the bis(thiophosphoryl)disulphides used are detailed below:

| | | | |
|---|---|---|---|
| Optimum time of cure (minutes) | 30 | 20 | 20 |
| Tensile strength | 257 | 235 | 215 |
| Modulus at 300% | 153 | 132 | 139 |
| Extension at break | 480 | 515 | 445 |
| Mooney scorch at 140° (minutes +10) | 25.5 | 18.5 | 24 |

| | Time of Cure (minutes) | Bis(diisopropyl-thiophosphoryl)-disulphide | Bis(di-cyclohexyl-thiophosphoryl)-disulphide | Bis(di-sec.-butyl-thiophosphoryl)-disulphide | Bis(di-sec.-octyl-thiophosphoryl)-disulphide |
|---|---|---|---|---|---|
| Tensile Strength kg./cm.² | 10 | 68 | 42 | 170 | 87 |
| | 20 | 262 | 273 | 266 | 276 |
| | 30 | 233 | 254 | 245 | 260 |
| Modulus 300% | 10 | 47 | 32 | 85 | 58 |
| | 20 | 175 | 171 | 182 | 151 |
| | 30 | 188 | 189 | 191 | 170 |
| Elongation at Break, percent | 10 | 414 | 396 | 518 | 414 |
| | 20 | 475 | 501 | 465 | 551 |
| | 30 | 403 | 436 | 410 | 490 |
| Mooney Scorch at 120° (minutes + 10) | | 50 | 42.5 | 38 | 40.5 |

EXAMPLE 7

The following rubber mixes are prepared by compounding on a rubber mill:

| | |
|---|---|
| Butadiene/styrene copolymer | 100 |
| Stearic acid | 1.5 |
| Zinc oxide | 3.5 |
| High abrasion furnace black | 50 |
| Softener | 4 |
| Processing oil | 4 |
| Sulphur | 1.8 |
| N-cyclohexylbenzthiazylsulphenamide | 1.2 |
| Bis(thiophosphoryl)disulphide | 0.5 |

Samples of these are cured at 153° C. for different lengths of time the properties of the vulcanisates and the bis(thiophosphoryl)disulphides used being detailed below. Results using no bis(thiophosphoryl)disulphide are included for comparison.

EXAMPLE 8

The following rubber mixes are prepared by compounding on a rubber mill:

| | O | P | Q |
|---|---|---|---|
| Styrene/butadiene copolymer | 100 | 100 | 100 |
| Stearic acid | 3 | 3 | 3 |
| Zinc oxide | 3.5 | 3.5 | 3.5 |
| High abrasion furnace black | 50 | 50 | 50 |
| Processing oil | 8 | 8 | 8 |
| Sulphur | 1.8 | 1.8 | 1.8 |
| N-cyclohexylbenzthiazylsulphonamide | 1.2 | 1.0 | 1.0 |
| Diphenylguanidine | | 0.4 | |
| Bis(diisopropyldithiophosphoryl)disulphide | | | 1.0 |

The optimum time of cure at 153° of these mixes and properties of the vulcanisates so obtained are as follows:

EXAMPLE 9

The following rubber mixes are prepared by compounding on a rubber mill:

| | R | S | T | U | V | W |
|---|---|---|---|---|---|---|
| Natural rubber smoked sheet | 100 | 100 | 100 | 100 | 100 | 100 |
| Stearic acid | 3 | 3 | 3 | 3 | 3 | 3 |
| Zinc oxide | 3.5 | 3.5 | 3.5 | 3.5 | 3.5 | 3.5 |
| High abrasion furnace black | 50 | 50 | 50 | 50 | 50 | 50 |
| Softener | 4 | 4 | 4 | 4 | 4 | 4 |
| Tert.-octylbenzthiazyl-sulphenamide | 0.5 | 0.5 | 0.5 | 0.5 | 0.5 | 0.5 |
| Sulphur | 2.5 | 1.5 | 1.0 | 1.5 | 1.5 | 1.0 |
| Bis(diisopropyldithiophosphoryl)disulphide | | | | 0.5 | 1.0 | 1.0 |

The Mooney Scorch time, optimum time of cure at 141° of these mixes and shear modulus of the vulcanisates so obtained are as follows:

| | | | | | | |
|---|---|---|---|---|---|---|
| Optimum cure time (minutes) | 32 | 35 | 40 | 27 | 22 | 27 |
| Relative shear modulus | 33 | 27 | 25 | 29 | 31 | 31 |
| Mooney Scorch at 120° (minutes+10) | 25.5 | 34.5 | 40.3 | 36.8 | 40.8 | 43 |

| | Time of Cure (minutes) | No bis(thiophosphoryl)-disulphide | Bis(diisopropyl-thiophosphoryl)-disulphide | Bis(dicyclohexyl-thiophosphoryl)-disulphide | Bis(di-sec.-butyl-thiophosphoryl)-disulphide |
|---|---|---|---|---|---|
| Tensile Strength, kg./cm.² | 10 | 129 | 191 | 56 | 154 |
| | 20 | 236 | 198 | 217 | 197 |
| | 30 | 221 | 189 | 228 | 211 |
| Modulus 300% | 10 | 47 | 38 | 29 | 72 |
| | 20 | 124 | 162 | 139 | 154 |
| | 30 | 142 | 175 | 156 | 166 |
| Elongation at Break, percent | 10 | 794 | 692 | 580 | 587 |
| | 20 | 563 | 392 | 472 | 403 |
| | 30 | 472 | 353 | 451 | 399 |
| Mooney Scorch at 140° (minutes + 10) | | 15 | 18.5 | 19 | 20 |

We claim:
1. In a process for the manufacture of vulcanised natural rubber and sulphur-curable synthetic rubbers derived to a major extent from diolefin monomers which comprises compounding said rubber with sulphur and a conventional sulphur-containing rubber vulcanisation accelerator selected from the group consisting of tetraalkylthiuram disulphides, tetraalkylthiuram monosulphides, mercaptobenzthiazyl disulphide, sulphenamides and derivatives of dithiocarbamic acid and heating said rubber to vulcanise it; the improvement which comprises having present during said vulcanisation a bis(thiophosphoryl) disulphide of the formula

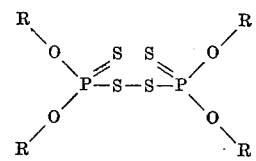

wherein each R is a member of the group consisting of alkyl, cycloalkyl and aryl groups.

2. A process as claimed in claim 1 wherein each R is an alkyl group containing at least 3 carbon atoms.

3. A process as claimed in claim 2 wherein each R is a member of the group consisting of secondary and tertiary alkyl groups.

4. A process as claimed in claim 1 wherein the total amount of conventional sulphur-containing rubber vulcanisation accelerator and bis(thiophosphoryl)disulphide is from 0.5 to 10% of the weight of rubber.

5. A process as claimed in claim 4 wherein the total amount of conventional sulphur-containing rubber vulcanisation accelerator and bis(thiophosphoryl)disulphide is from 0.5 to 2% of the weight of rubber.

6. A process as claimed in claim 1 wherein the bis(thiophosphoryl)disulphide comprises from 15 to 90% of the total of conventional sulphur-containing rubber vulcanisation accelerator and bis(thiophosphoryl)disulphide.

7. A process as claimed in claim 1 wherein the bis(thiophosphoryl)disulphide comprises from 30 to 70% of the total of conventional sulphur-containing rubber vulcanisation accelerator and bis(thiophosphoryl)disulphide.

8. A process as claimed in claim 1 wherein the amount of sulphur is between 0.2 and 3.5% of the weight of the rubber.

9. A process as claimed in claim 8 wherein the amount of sulphur is less than 2% of the weight of the rubber.

10. A process as claimed in claim 1 wherein the heating is carried out at a temperature between 120° and 160° C.

11. A process as claimed in claim 1 wherein said rubber is compounded with a furnace black in addition to sulphur, conventiontal sulphur-containing rubber vulcanisation accelerator and bis(thiophosphoryl)disulphide.

12. A vulcanisable composition of a member of the group consisting of natural rubber and sulphur-curable synthetic rubbers derived to a major extent from diolefin monomers characterised in that there is contained therein sulphur, a conventional sulphur-containing rubber vulcanisation accelerator selected from the group consisting of tetraalkylthiuram disulphides, tetraalkylthiuram monosulphides, mercaptobenzthiazyl disulphide, sulphenamides and derivatives of dithiocarbamic acid and a bis(thiophosphoryl)disulphide of the formula

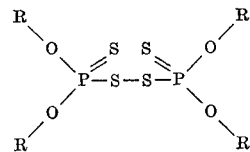

wherein each R is a member of the group consisting of alkyl, cycloalkyl and aryl groups.

13. A process for the manufacture of vulcanised natural rubber and sulphur-curable synthetic rubbers derived to a major extent from diolefin monomers as set forth in claim 1 in which said conventional sulphur-containing rubber vulcanisation accelerator is selected from the group consisting of tetramethylthiuram disulphide, tetraethylthiuram disulphide, tetrabutylthiuram disulphide, bispentamethylenethiuram disulphide, tetramethylthiuram monosulphide, mercaptobenzthiazole, zinc mercaptobenzthiazole, cyclohexylbenzthiazyl sulphenamide, tert.-octylbenzthiazyl sulphenamide, tert.-butylbenzthiazyl sulphenamide, N-oxydiethylenebenzthiazyl sulphenamide, diisopropylbenzthiazyl sulphenamide, dithiopiperidine, dithiomorpholine, condensates of benzthiazyl sulphenamide with aldehydes, zinc diethyl-dithiocarbamate, zinc pentamethylenedithiocarbamate and diisopropyl(diethylthiocarbamyl) dithiophosphate.

References Cited

UNITED STATES PATENTS

| | | | |
|---|---|---|---|
| Re 20,411 | 6/1937 | Romieux et al. | 18—53 |
| 3,218,291 | 11/1965 | Kendall et al. | 260—459 |

MORRIS LIEBMAN, *Primary Examiner.*

S. L. FOX, *Assistant Examiner.*

U.S. Cl. X.R.

260—79.5, 783